Figure 1:
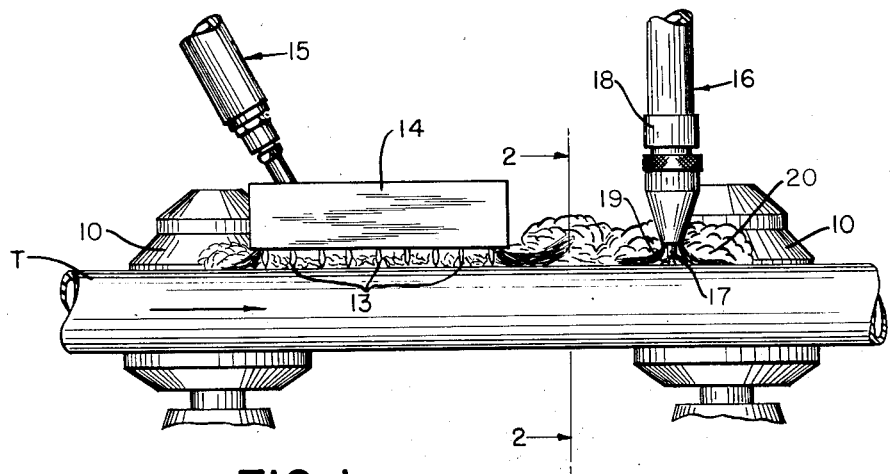

INVENTOR
HAROLD O. JONES

Patented June 6, 1950

2,510,180

UNITED STATES PATENT OFFICE 2,510,180

METHOD OF MAKING TUBES

Harold Owen Jones, Pleasantville, N. Y., assignor to Air Reduction Company, Incorporated, a corporation of New York Application February 25, 1948, Serial No. 10,672

2 Claims. (Cl. 219—10)

This invention relates to that kind of tube making in which flat metal skelp is formed into tubular shape by bending it so that the lateral edges of the skelp are brought together to form a longitudinal seam which is then progressively welded.

Various methods have been proposed for progressively welding the longitudinal seams of tubes formed in this manner. One such method involves the use of oxyacetylene flames for heating the metal at the seam edges to welding temperature. In another method the seam is welded by electric arc welding means, the welding electrode being either a fusible consuming metallic electrode of the type from which metal is transferred to the work through the arc, or an electrode of the type which produces a non-depositing arc, such as a tungsten electrode. The first-mentioned type of electrode will be referred to herein as a fusible electrode and the second-mentioned type as a non-consuming electrode. In a tube making method in which the longitudinal seam of the tubes is arc welded it is advantageous to use that type of arc welding means in which the electrode is of the non-consuming type. This is so for a number of reasons, among which are the following: The tube making method can be conducted more economically because the cost of the deposited metal, when a fusible electrode is used, reaches a sizeable sum over a period of time; considerable spattering of the deposited metal occurs when the electrode is of the fusible type and this makes it difficult to control penetration; and when the electrode is of the fusible type, the metal that passes from the electrode to the work is frequently changed in character as it passes through the arc, and therefore the metal of the electrode must be different from the metal of the tube and must be so chosen as to allow for the change in its character if it is desired that the weld metal be the same as the metal of the tube, which is usually the case.

The present invention contemplates welding the longitudinal seams of tubes in such a way as to bring about an overall improvement in similar tube making methods previously used, such as greater economy; greater facility with which the method is conducted and less attention on the part of the operatives; greater welding speed and consequently increased production; and a superior weld at the seam. Therefore, the longitudinal seam of the tubes is progressively arc welded, according to the invention, by arc welding means having an electrode of the non-consuming type, such as a tungsten electrode, which will produce a non-depositing arc. However, while the use of an electrode of this type for progressively welding the longitudinal seam of the tubes has various advantages as above stated, it nevertheless places a definite limitation on the amount of welding current that can be used and on the intensity of the arc. If the welding current is increased too much in an attempt to give the arc greater intensity the molten metal at the weld boils and spatters before there is deep enough penetration. Intermittent or porous welds therefore result. This inability of a non-consuming electrode to have its arc intensity safely increased above a certain limit may not be a serious disadvantage if a relatively slow welding speed can be tolerated because under these circumstances the arc acts on each successive portion of the seam for a longer period of time and therefore an arc of relative high intensity is not required in order to produce a weld of deep penetration, but it makes it impossible to obtain an increase in welding speed and a consequent increase in production by increasing the welding current and the intensity of the arc beyond a certain value. Therefore, in order to make it possible to use a non-consuming electrode for progressively welding the longitudinal seams of the tubes and obtain the advantages incident to the use of this kind of electrode, and to use an arc of low enough intensity to avoid spattering and disruption of the weld metal, and at the same time conduct the welding operation at relatively high speed, I use, in conjunction with the non-consuming welding electrode, means which will preheat the seam edges just prior to being welded until the metal at the seam edges is heated almost to welding temperature.

Another advantage of preheating the seam edges is that when the welding arc employed for welding the seam is of the type which is struck between the electrode and the work, the preheating increases the stability of the electric arc. A stable and highly efficient arc is necessary if the objects of the invention are to be obtained. High welding speeds necessitate efficient transfer of heat to the work and deep penetration of the arc, and to effect these results a stable arc is necessary. The preheating destroys the magnetic properties of the metal which, unless destroyed, have a tendency to disturb the stability of the arc. It is also believed that preheating of the seam edges causes electrons to be emitted from the heated metal, and the concentration of electrons between the tip of the welding electrode and the work provides a low resistance stable path for the arc which tends to give the arc greater stability. Regardless of what the explanation may be, however, it is apparent from observation that the arc has a greater attraction for heated metal.

The type of preheating employed, however, is of considerable importance, according to the invention, because it must cooperate with the chosen arc welding means to carry out the object of improving known tube welding methods, not only by increasing welding speed and production but by improving the character of the weld at the tube seam. Therefore, in accordance with the invention the preheating is of the flame type. The use of flames for preheating has many advantages in the method of the invention, some of which are as follows:

When the tube seam is arc welded it is especially important that the seam edges be free from oxide scale and other arc inhibiting material. When preheating flames are employed they not only perform their primary function of heating the metal at the seam edges to near welding temperature but they may be so used that the seam edges are under the continuous protection of the flame envelopes and the products of combustion which thus prevent oxidation of the metal at the seam edges prior to the welding operation. The arc is then free to act efficiently on clean surfaces and the weld is completed without undesirable scale adhesions. Other preheating means, such as a series of electric arcs, will not ordinarily accomplish this result. Moreover, electric arcs heat only localized areas, whereas a flame system provides an even and more gradual preheating of the seam edges which makes it possible for the tube to absorb heat throughout its cross-section, and this heating of all of the tube metal causes the weld to cool more slowly, thereby avoiding many of the metallurgical defects which result when a weld is cooled too rapidly.

The preheating flames may be provided in any suitable way but they are preferably flames produced by an oxyacetylene heating torch. When flames of this type are used the gas mixture can be adjusted, if so desired, so that it has a slight excess of acetylene to produce flames that are reducing in character so that any oxides which may happen to be present on the seam edges will be reduced and removed.

The arc welding of the seam is preferably performed in an atmosphere of inert gas such as helium or argon. Hydrogen may also be used, and in some cases is more desirable, because of its ability to produce an arc of great heat intensity when the arc is passed through it as in atomic hydrogen welding. Primarily, however, the gas employed should serve as a shield for the arc and for the weld metal and the tube metal in the vicinity of the welding zone, and exclude the surrounding atmosphere and prevent oxidation. The provision of a gaseous atmosphere at the welding arc extends the protected zone afforded by the preheating flame envelopes and the products of combustion uninterruptedly until the weld has been made. A suitable type of shielded-arc welding means to employ is a so-called "Heliweld" electric welding torch, or an electric welding torch of the type used in atomic hydrogen welding. Both of these have tungsten electrodes. The Heliweld torch has means for delivering a stream of helium, or other inert gas, which forms a shield for the arc, and the torch used in atomic hydrogen welding has means for supplying an atmosphere of hydrogen through which the arc passes. Any other type of electric welding torch having a non-consuming electrode and with which there is associated means for providing the gas shield may also be employed.

The method according to the invention, briefly stated, therefore comprises forming the skelp to tubular shape by bending it to bring the lateral edges of the skelp together to form a longitudinal seam, whether this be done immediately prior to the progressive welding of the seam, or at some other time; then progressively welding the seam by an electric non-depositing arc which is preferably a gas shielded arc; and preheating the seam edges just prior to the time they reach the welding arc by means of preheating flames which are preferably the flames of an oxyacetylene heating torch.

Figure 2:
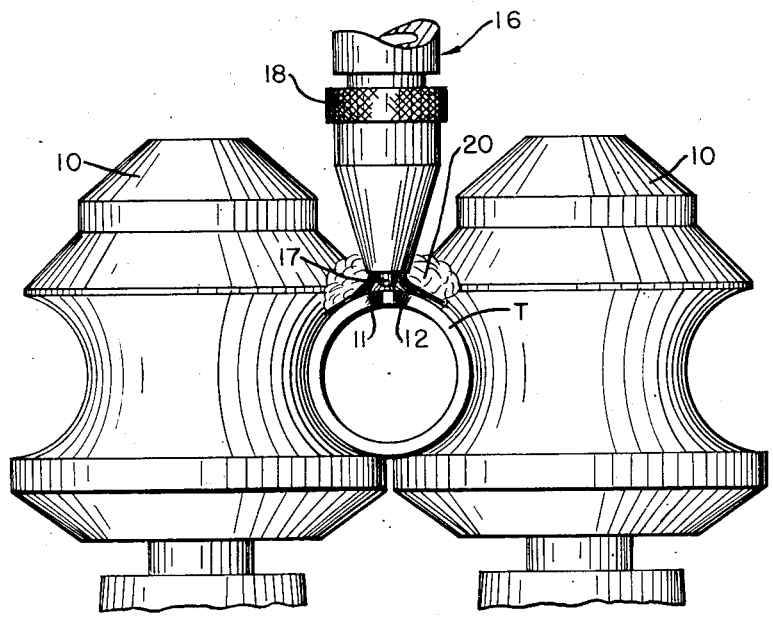

One type of apparatus suitable for carrying out the method is illustrated in the accompanying drawings, in which:

Figure 1 is a side elevation of the apparatus with the feed and welding rolls at the near side of the apparatus omitted in order to expose parts of the apparatus lying beyond them; and Fig. 2 is an enlarged transverse section taken on the line 2—2 of Fig. 1.

Referring to the drawing, a portion of a tube being welded is represented at T. It is fed past the welding station in the direction indicated by the arrow by a series of rolls 10 arranged in pairs along the path of travel of the tube. In Fig. 1, only the rear rolls of two pairs of the feed rolls appear, the forward rolls having been omitted to expose the welding instrumentalities. Fig. 2, however, shows both rolls of a single pair. The rolls illustrated are of the type which are mounted to rotate about a vertical axis and have concave faces such that the concave face of one roll complements the concave face of the outer roll of the same pair to form a pass of substantially circular cross-section through which the tube passes, as shown in Fig. 2.

When the tube reaches the vicinity of the first pair of rolls 10 the longitudinal seam of the tube is preferably open. The open seam is shown in Fig. 2 between the seam edges 11 and 12 of the tube. While the seam edges are thus spaced apart they are preheated by a number of flames 13 projected against them from the tip 14 of an oxyacetylene heating torch 15 and arranged in a series extending lengthwise of the tube seam.

Immediately after being preheated by the flames 13 the seam edges are brought together by the action of the next pair of rolls 10 and the seam then passes under an arc welding torch 16. The welding torch has an electrode 17 held in an electrode holder 18. An arc 19 is struck between the tip of the electrode and the tube seam. Thus, the tube seam is progressively welded as it moves under the welding torch. The electrode 17 of the welding torch is a non-consuming electrode made of some material, such as tungsten, which does not fuse during the welding operation and deposit metal at the weld.

The electrode holder 18 is equipped with suitable electrical connections for supplying welding current to the electrode and with means for adjusting the position of the holder and the electrode, none of which are shown in the drawing because their illustration is not necessary for an understanding of the invention. The electrode holder also has suitable gas connections (not shown) to provide a gas shield 20 around the arc 19. As already stated, the gas used for the shield may be an inert gas such as helium or argon, or as in atomic hydrogen welding, it may be hydrogen. The particular welding torch illustrated in the drawing, is a so-called "Heliweld" torch in which the gas used for the shield is usually helium, but if desired, a welding torch of the kind used in atomic hydrogen welding could be used.

A sufficient supply of the shielding gas is employed to provide a protective atmosphere that shields portions of the tube seam in advance of and beyond the welding zone as well as in the immediate vicinity of the arc. It is not essential that the gas for the shield be discharged through the electrode holder. It could just as well be discharged from some auxiliary nozzle arranged to deliver the gas in the vicinity of the arc and along those portions of the tube seam which it is desired to shield.

The pair of rolls 10 between which the tube passes immediately after passing under the arc may be adjusted so that they exert enough pressure on the seam edges while the metal at the edges is still fused or plastic to form a slight upset at the weld.

The welding of the tube may be performed independently of, or as part of prior forming and shaping operations. If the welding operation is part of the prior forming and shaping operations the rolls 10 at the left side of Fig. 1 may be the final set of forming rolls.

Additional rolls intermediate those shown in Fig. 1 may be employed if desired, along with a seam guiding device if necessary, to maintain the seam edges in their proper spaced relation until they are brought together just prior to reaching the welding arc. Or, if desired, the apparatus may be arranged to keep the the seam edges in contact during the entire operation. If the tube seam is open when it passes under the heating flames it is preferable to use a torch tip of the kind that will project two rows of heating flames so that one row of flames may be projected against the edge portion of the tube at one side of the seam and the other row projected against the edge portion of the tube along the opposite side of the seam.

In the preferred practice of the invention the tube is moved at such speed that in moving the length of the series of heating flames 13 the metal at the seam edges of the tube is heated to a temperature only slightly lower than the fusion temperature of the metal. In subsequently moving under the welding arc the metal at the seam edges is brought to welding temperature.

In tube welding operations of the type herein described having arc welding means with a non-consuming electrode for welding the tube seams, as heretofore practiced without the use of preheating flames, the molten metal in the welding zone was vigorously boiled and spattered even when small increases in welding speed were attempted by increasing the welding current and intensifying the arc. Because of the required intensity of the arc, the outer tube metal began to boil before the weld had sufficient time to penetrate. In my improved method the use of the preheating flames enables the arc to penetrate and complete the weld within an extremely short interval of time without causing the outer metal first to boil or spatter. Consequently, greater welding speeds are made possible while utilizing a non-depositing arc at an intensity at which this type of arc is adapted to operate without producing the objectionable boiling and spattering of the weld metal, and much improved welds can be obtained.

Actual use of my method has shown that welding speeds heretofore obtained by similar methods can be more than doubled. In one application of the method, when welding tubes made of Monel metal having a wall thickness of the order of 0.15", preheating the seam edges to a temperature between 500 and 1500° F. by oxyacetylene preheating flames increased by more than threefold a maximum welding speed of 20" per minute that was obtainable without the use of the preheating flames, and also produced a better weld.

It should be understood that the method is equally effective for welding tubes made of nickel, chrome-nickel, stainless steel, and other ferrous and non-ferrous metals.

I claim:

1. The method of making welded tubes which comprises forming metal skelp to tubular shape by bending it to bring the lateral edges of the skelp together to form a longitudinal seam, moving the tube past a preheating station and a welding station, at the preheating station projecting a flame, against the seam to preheat the seam edges, utilizing the flame and the products of combustion to provide a shield for the seam edges being preheated, at the welding station arc welding the seam while the seam edges are still hot from the preheating, and providing a gas shield for the welding arc such that it forms a continuation of the shield produced by the preheating flame and extends the protected zone of the seam edges afforded by such shield.

2. The method of claim 1 in which a series of flames is used for progressively preheating and a non-depositing arc is used for welding the seam edges.

HAROLD OWEN JONES.

REFERENCES CITED

The following references are of record in the file of this patent:

UNITED STATES PATENTS

| Number | Name | Date |
|---|---|---|
| 1,085,639 | Snodgrass | Feb. 3, 1914 |

FOREIGN PATENTS

| Number | Country | Date |
|---|---|---|
| 444,039 | Great Britain | Mar. 12, 1936 |